US012786093B2

(12) United States Patent
Jin et al.

(10) Patent No.: US 12,786,093 B2
(45) Date of Patent: Nov. 3, 2026

(54) AUTOMATED COMPLIANCE TESTING OF A DUT WITH COMMUNICATION INTERFACES

(71) Applicant: Rohde & Schwarz GmbH & Co. KG, Munich (DE)

(72) Inventors: Yi Jin, Singapore (SG); KokMeng Wong, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 326 days.

(21) Appl. No.: 18/394,429

(22) Filed: Dec. 22, 2023

(65) Prior Publication Data

US 2024/0275711 A1 Aug. 15, 2024

(30) Foreign Application Priority Data

Feb. 10, 2023 (EP) .................................... 23155939

(51) Int. Cl.
*H04L 43/55* (2022.01)
*H04L 41/22* (2022.01)

(52) U.S. Cl.
CPC .............. *H04L 43/55* (2022.05); *H04L 41/22* (2013.01)

(58) Field of Classification Search
CPC .......... H04L 43/55; H04L 41/22; H04L 43/08
See application file for complete search history.

(56) References Cited

U.S. PATENT DOCUMENTS

| | | | | |
|---|---|---|---|---|
| 2004/0064760 | A1* | 4/2004 | Hicks | H04L 41/5009 714/43 |
| 2011/0087942 | A1* | 4/2011 | Conner | G01R 31/31908 714/738 |
| 2014/0236527 | A1 | 8/2014 | Chan et al. | |
| 2014/0321285 | A1* | 10/2014 | Chew | H04L 43/10 370/236 |
| 2022/0163586 | A1 | 5/2022 | Jin et al. | |
| 2022/0286159 | A1 | 9/2022 | Dai et al. | |

FOREIGN PATENT DOCUMENTS

CN 114 460 434 A 5/2022

OTHER PUBLICATIONS

Rohde & Schwarz GmbH & Co. KG; "Verifying 10BASE-T1S Interfaces for Automotive Ethernet"; PD 3608.4100.92; Version 01.00; May 2020; pp. 1-4.
Extended European Search Report issued in EP 23155939.4-1216 by the European Patent Office on Jul. 7, 2023.

* cited by examiner

*Primary Examiner* — Mohammad S Anwar
(74) *Attorney, Agent, or Firm* — Studebaker Brackett PLLC

(57) ABSTRACT

A method for automated compliance testing of a device under test (DUT) is provided. The DUT is provided with more than one communication interface for a wireless and/or a wire-bound protocol. The communication interfaces are configured for at least two different communication protocols. The method includes the steps of assigning (11) a test protocol to each of the communication interfaces, and automatically executing (12), at least once, each of the test protocols.

12 Claims, 6 Drawing Sheets

AUTOMATED COMPLIANCE TESTING OF A DUT WITH COMMUNICATION INTERFACES

The invention relates to the field of compliance testing of a communication device under test (DUT).

Generally, in times of an increasing number of communication applications, there is a growing need for compliance testing a device under test in order to verify correct functioning of such applications in a particularly efficient manner.

Document US 2022/0163586 A1 relates to a self-diagnosing measurement system. The measurement system includes a first measurement instrument, a device under test, and a diagnosis module. The first measurement instrument is connected with the device under test in a signal-transmitting manner. The first measurement instrument includes a testing module. The testing module is configured to automatically conduct a predefined test routine on the device under test. The diagnosis module is configured to automatically conduct a diagnosis routine on the measurement system in order to detect faults in the measurement system. Further, a self-diagnosis method for detecting faults in a measurement system is described.

Moreover, document "10BASE-T1S-SCHNITTSTELLEN FÜR AUTOMOTIVE-ETHERNET VERIFIZIEREN" being an application note provided by Rohde & Schwarz GmbH & Co. KG, which relates to verification of 10BASE-T1S-interfaces for automotive Ethernet. Disadvantageously, in this context, exclusively compliance with respect to the 10BASE-T1S protocol can be tested, which leads to a limited efficiency of testing.

Accordingly, there is the object to provide a DUT compliance testing with improved efficiency.

This object is solved by the features of the independent claims. The dependent claims contain further developments.

According to a first aspect of the invention, a method for automated compliance testing of a device under test (DUT) is provided. The DUT is provided with more than one communication interface for a wireless and/or a wire-bound protocol. The communication interfaces are configured for at least two different communication protocols. Said method comprises the steps of assigning a first protocol test to the test profile and assigning a second protocol test to the test profile. Advantageously, compliance testing can be performed with respect to multiple protocols, thereby ensuring a particularly high efficiency.

According to a first preferred implementation form of the first aspect of the invention, the test protocols are executed at one test cycle, especially the same test cycle. Advantageously, for instance, compliance testing can be sped up, which leads to an increased efficiency.

According to a second preferred implementation form of the first aspect of the invention, the method further comprises the step of repeatedly executing at least a part, preferably each, of the test protocols. Advantageously, for example, compliance testing can further be automated, thereby reducing inefficiencies.

According to a further preferred implementation form of the first aspect of the invention, the method further comprises the step of setting up at least a part, preferably each, of the test protocols with the aid of a user program and/or a script. Advantageously, for instance, efficiency can further be increased.

According to a further preferred implementation form of the first aspect of the invention, the method further comprises the step of setting up the respective speed during corresponding run time with respect to at least a part, preferably each, of the test protocols with the aid of a user program and/or a script. Advantageously, for example, inefficiencies can further be reduced.

According to a further preferred implementation form of the first aspect of the invention, the user program and/or the script is configured as a plug-in. Advantageously, for instance, a high flexibility can be ensured, thereby increasing efficiency.

According to a further preferred implementation form of the first aspect of the invention, compliance testing comprises or is PHY compliance testing and/or Ethernet compliance testing. Advantageously, for example, Ethernet compliance testing can comprise compliance testing with respect to 10BASE-T1S and/or 100BASE-T1 and/or 1000BASE-T1.

According to a further preferred implementation form of the first aspect of the invention, executing at least a part, preferably each, of the test protocols comprises applying at least one of different signal characteristics, preferably different test signal frequencies and/or different test signal levels, different disturbing signals, preferably different random disturbing signals and/or different pre-defined disturbing signals, different standards, preferably different communication standards and/or different IEEE standards. Advantageously, for instance, compliance testing can be performed in a particular flexible, and thus also efficient, manner.

According to a further preferred implementation form of the first aspect of the invention, the method further comprises the steps of switching to at least one further device under test especially in an automated manner and performing at least one of the steps of the method according to any of the preceding implementation forms to said at least one further device under test. Advantageously, for example, multiple devices can be tested without the need of human interventions, which leads to an increased efficiency.

As an alternative, especially in the case that said step of switching is omitted, the method may comprise the step of performing at least one of the steps of the method according to any of the preceding implementation forms to said at least one further device under test in parallel to the device under test.

According to a further preferred implementation form of the first aspect of the invention, the method further comprises the step of creating a central report comprising the corresponding test results from at least a part, preferably each, of the test protocols and/or, especially in the case of the presence of at least one further device under test, from at least one test with respect to the at least one further device under test, preferably at least a part or each of further test protocols. Advantageously, for instance, one central report can cover all data and results from testing of multiple protocols and multiple executions, thereby increasing efficiency.

According to a further preferred implementation form of the first aspect of the invention, the method further comprises the step of performing a statistical analysis, preferably a statistical analysis comprising at least one graph especially visualizing at least a part of said statistical analysis, more preferably a statistical analysis comprising at least one pie chart especially visualizing at least a part of said statistical analysis, most preferably a statistical analysis comprising at least one graph and/or at least one pie chart for a synopsis of the corresponding test results of the central report, on the basis of the central report. Advantageously, for example, user can customize and/or select corresponding test results, statistical analysis and graphs to be archived in the report, thereby reducing inefficiencies.

With respect to the above-mentioned statistical analysis, it is noted that it might be particularly advantageous if said statistical analysis is performed with the aid of artificial intelligence, preferably a machine learning algorithm, more preferably a deep learning algorithm.

According to a further preferred implementation form of the first aspect of the invention, the method further comprises the steps of displaying the statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report, especially with the aid of a display unit and/or a graphical user interface, and/or updating the statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report, especially in real time. Advantageously, for instance, a live view of the statistical analysis or the results thereof, respectively, can be provided during compliance testing, which leads to an increased efficiency.

According to a second aspect of the invention, a computing device is provided, the computing device being configured to perform at least one of the steps of the method according to the first aspect of the invention or any of its preferred implementation forms, respectively. Advantageously, compliance testing can be performed with respect to multiple protocols, thereby ensuring a particularly high efficiency.

According to a third aspect of the invention, a measurement device for compliance testing a device under test is provided. Said measurement device comprises a computing device according to the second aspect of the invention, and a wireless and/or wired interface being connectable to the device under test. Advantageously, compliance testing can be performed with respect to multiple protocols, thereby ensuring a particularly high efficiency.

According to a first preferred implementation form of the third aspect of the invention, the wireless and/or wired interface is connectable to at least one further device under test. In addition to this or as an alternative, the measurement device further comprises at least one further wireless and/or wired interface being connectable to at least one further device under test. Advantageously, for instance, multiple devices can be tested without the need of human interventions, which leads to an increased efficiency.

Exemplary embodiments of the invention are now further explained with respect to the drawings by way of example only, and not for limitation. In the drawings.

Figure 1:
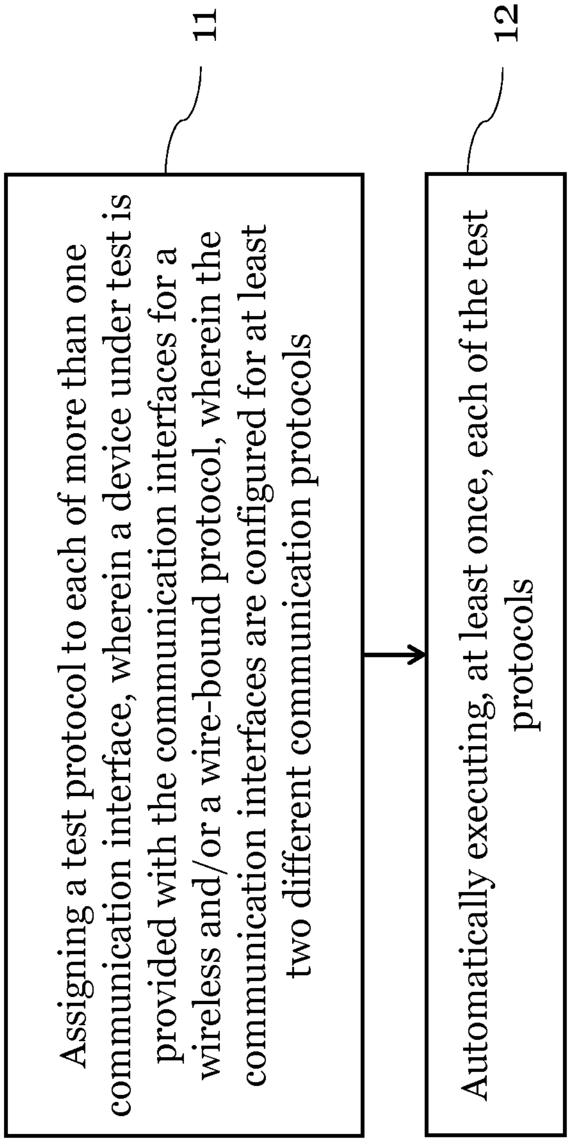
FIG. 1 shows a flow chart of an exemplary embodiment of the inventive method.

Firstly, FIG. 1 shows a flow chart of an embodiment of the inventive method for compliance testing a device under test, wherein the device under test is provided with more than one communication interface for a wireless and/or a wire-bound protocol, wherein the communication interfaces are configured for at least two different communication protocols. A first step 11 comprises assigning a test protocol to each of the communication interfaces. A second step 12 comprises automatically executing, at least once, each of the test protocols.

It is noted that it might be particularly advantageous if the test protocols are executed at one test cycle, especially the same test cycle. Advantageously, multiple protocols for a device under test do not have to be tested one by one, which leads to an increased efficiency in the context of compliance testing. Further advantageously, reporting is not limited to one protocol and one test execution.

Figure 2:
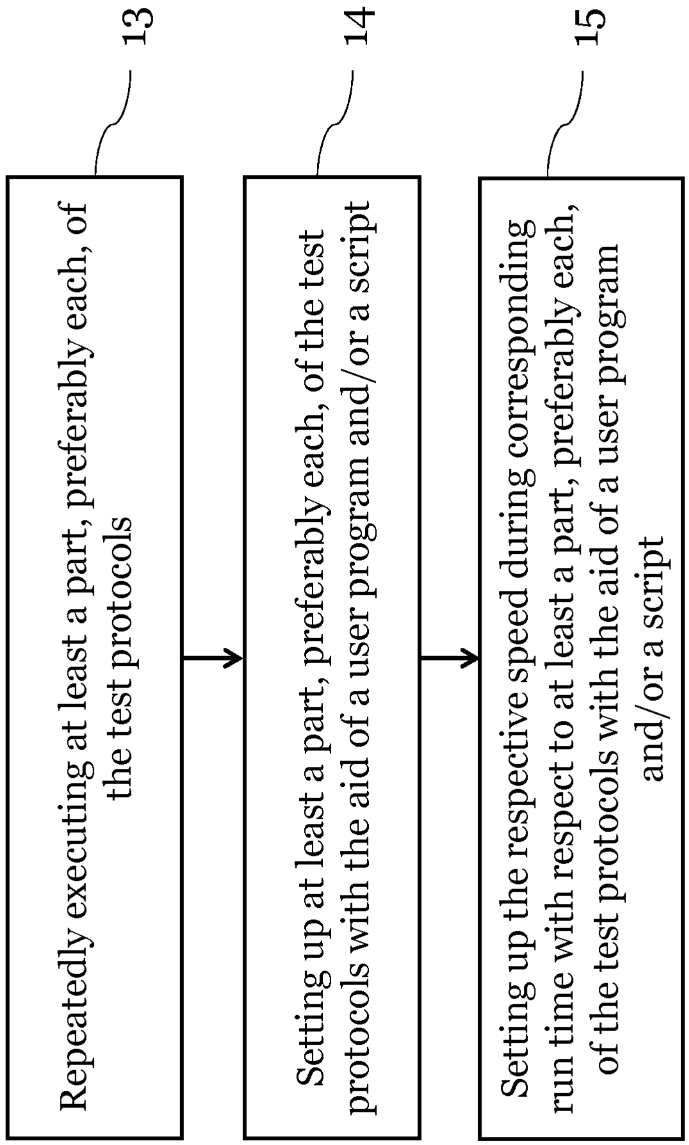
FIG. 2 shows further exemplary steps of the method.

As it can be seen from FIG. 2, the method may further comprise a step 13 of repeatedly executing at least a part, preferably each, of the test protocols. Advantageously, stability and/or repeatability tests can be run in a particularly efficient and automated way. For example, this allows for running a group of test cases with some of them configured to test repeatedly.

Further advantageously, this allows for automating multi-protocol and multi-execution compliance testing in one test cycle preferably with a central report generated especially in accordance with a user's configuration. Said central report is discussed in greater detail below. Accordingly, the method may comprise the step of scheduling multiple protocols and/or execution one multiple at time. Additionally, or alternatively, the method may comprise the step of automating multiple protocols and/or multiple execution in one test cycle, especially the same test cycle.

With respect to the above-mentioned multiple execution, it is noted that it might be particularly advantageous if said multiple execution comprises or is multiple execution of test cases preferably comprising at least one of an individual test case, a sub-test, a group of speed, protocols, or any combination thereof.

According to step 14 of FIG. 2, the method may further comprise the step of setting up at least a part, preferably each, of the test protocols with the aid of a user program and/or a script.

Moreover, the method may further comprise a step 15 of setting up the respective speed during corresponding run time with respect to at least a part, preferably each, of the test protocols with the aid of a user program and/or a script.

With respect to the above-mentioned user program and/or script, it is noted that it might be particularly advantageous if the user program and/or the script is configured as a plug-in.

Furthermore, with respect to the above-mentioned compliance testing, it is noted that said compliance testing may especially comprise or be PHY compliance testing and/or Ethernet compliance testing.

Moreover, with respect to the above-mentioned first protocol test or the second protocol test, respectively, it might be particularly advantageous if executing at least a part, preferably each, of the test protocols comprises applying at least one of different signal characteristics, preferably different test signal frequencies and/or different test signal levels, different disturbing signals, preferably different random disturbing signals and/or different pre-defined disturbing signals, different standards, preferably different communication standards and/or different IEEE standards.

Figure 3:
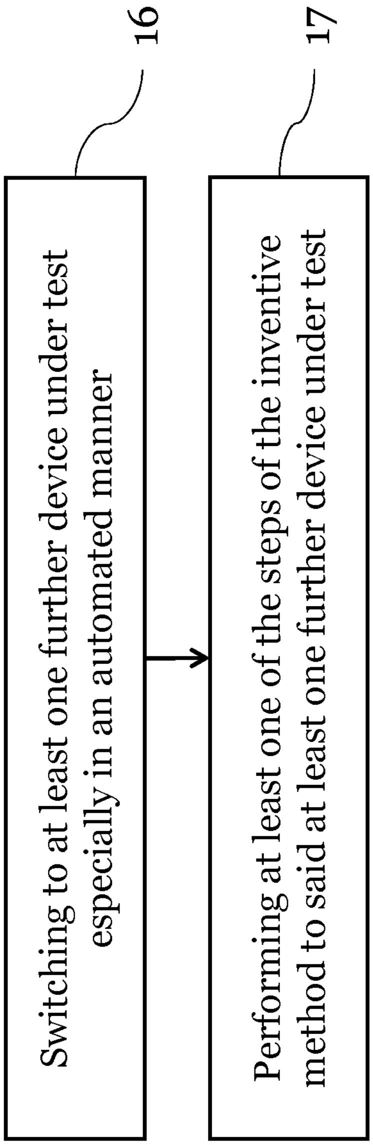
FIG. 3 shows further exemplary steps of the method.

It is further noted that it might be particularly advantageous if the method further comprises the steps of switching to at least one further device under test especially in an automated manner as exemplarily shown by step 16 of FIG. 3 and performing at least one of the above-mentioned steps to said at least one further device under test as illustrated by exemplary step 17 of said FIG. 3.

As an alternative, especially in the case that said step 16 of switching is omitted, the method may comprise the step of performing at least one of the above-mentioned steps to at least one further device under test in parallel to the device under test.

Figure 4:
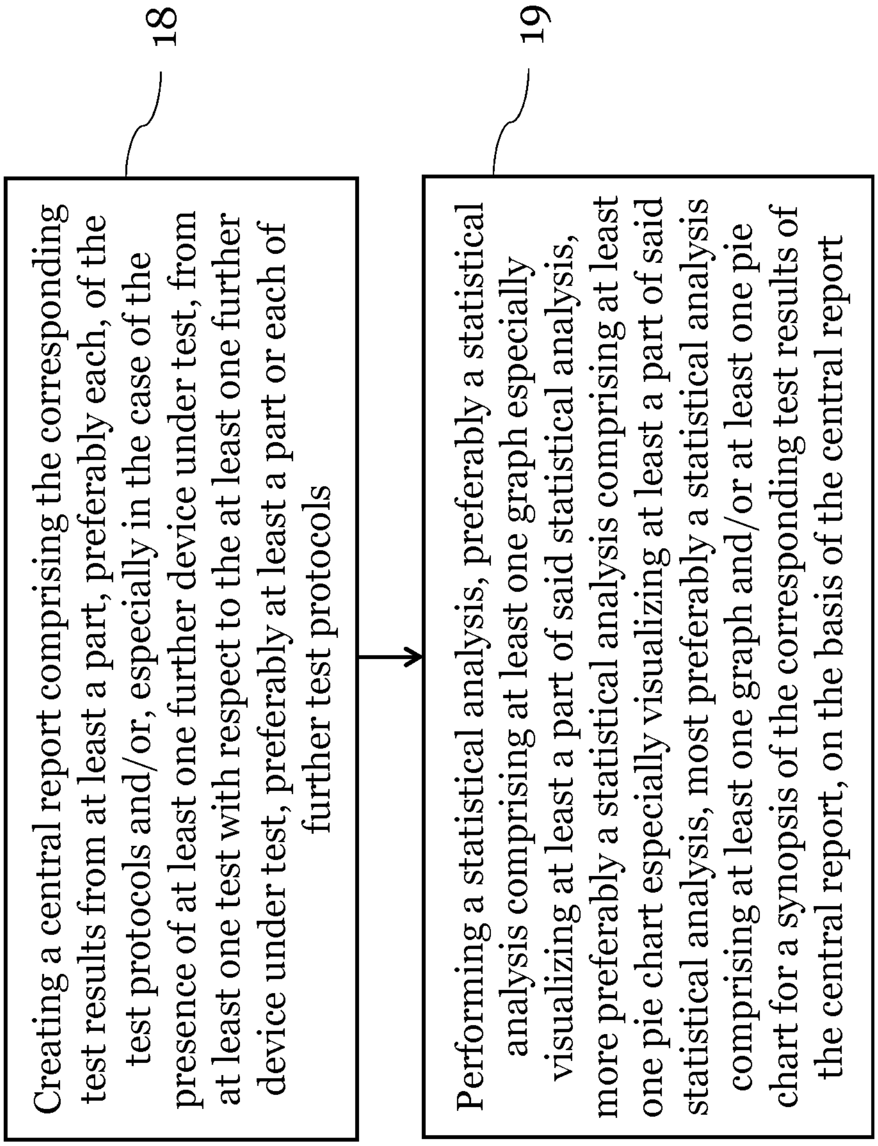
FIG. 4 shows further exemplary steps of the method.

In accordance with step 18 of FIG. 4, it might be particularly advantageous if the method further comprises the step of creating a central report comprising the corresponding test results from at least a part, preferably each, of the test protocols and/or, especially in the case of the presence of the above-mentioned at least one further device under test, from at least one test with respect to the at least one further device under test, preferably at least a part or each of further test protocols.

As it can be seen from step 19 of FIG. 4, it might be particularly advantageous if the method further comprises the step of performing a statistical analysis, preferably a statistical analysis comprising at least one graph especially visualizing at least a part of said statistical analysis, more preferably a statistical analysis comprising at least one pie chart especially visualizing at least a part of said statistical analysis, most a preferably statistical analysis comprising at least one graph and/or at least one pie chart for a synopsis of the corresponding test results of the central report, on the basis of the central report.

With respect to the above-mentioned statistical analysis, it is noted that it might be particularly advantageous if said statistical analysis is performed with the aid of artificial intelligence, preferably a machine learning algorithm, more preferably a deep learning algorithm.

Figure 5:
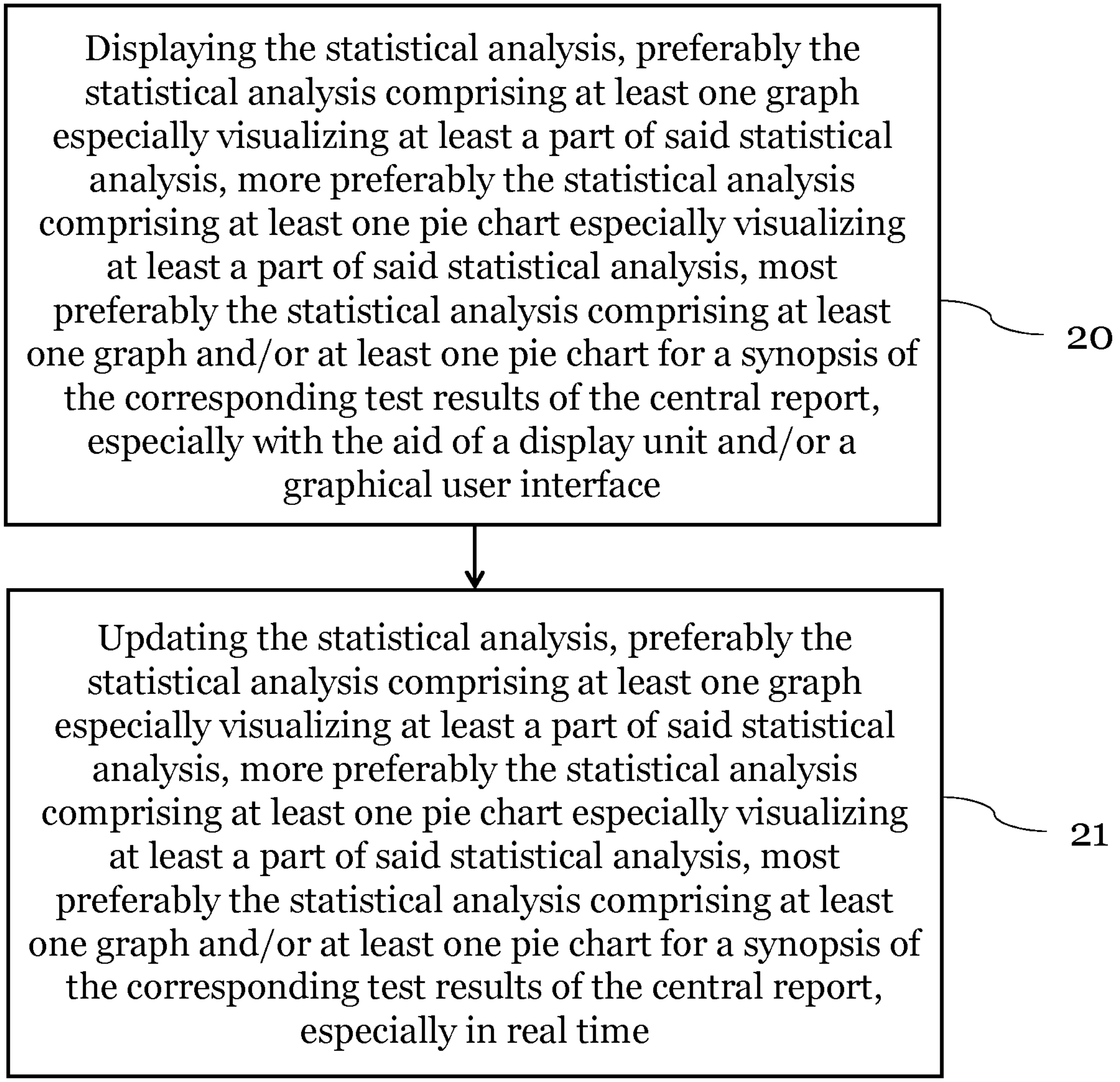
FIG. 5 shows further exemplary steps of the method.

According to step 20 of FIG. 5, it might be particularly advantageous if the method further comprises the step of displaying the statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report, especially with the aid of a display unit and/or a graphical user interface.

In addition to this or as an alternative, as it can be seen from step 21 of said FIG. 5, it is noted that it might be particularly advantageous if the method further comprises the step of updating the statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report, especially in real time.

Figure 6:
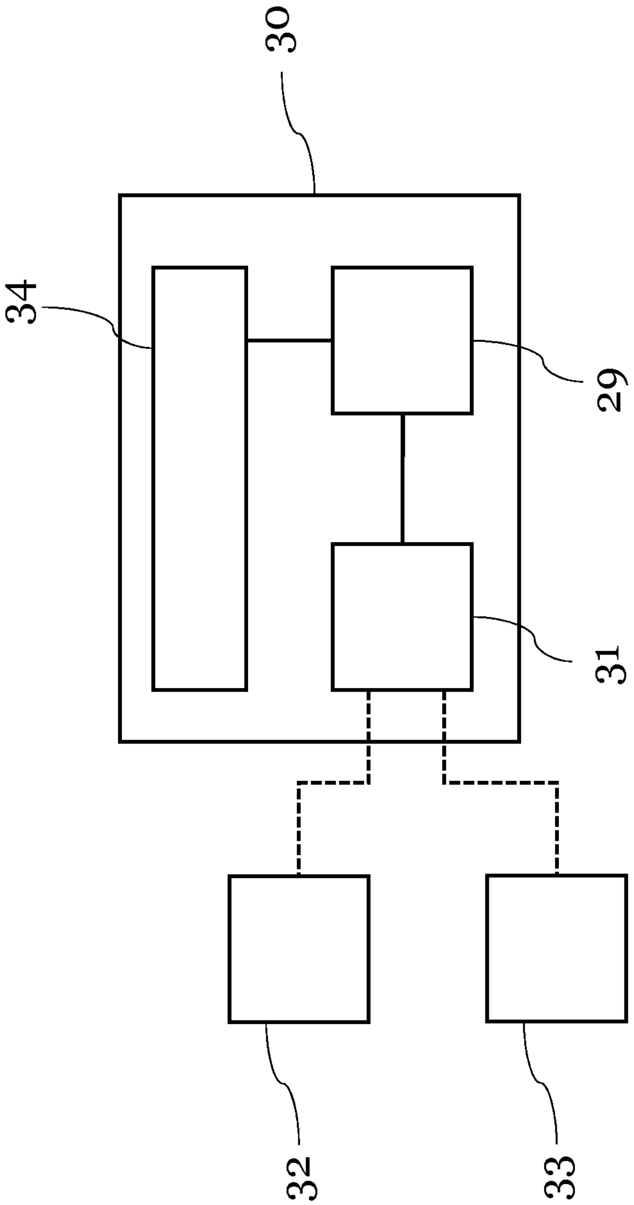
FIG. 6 shows a block diagram of an exemplary embodiment of the device inventive measurement in combination with the second aspect of the invention.

Finally, FIG. 6 illustrates a block diagram of an exemplary embodiment of the inventive measurement device 30 in combination with an exemplary embodiment of the second aspect of the invention, namely the computing device 29, wherein said measurement device 30 exemplarily comprises said computing device 29.

With respect to said computing device 29, it is noted that it might be particularly advantageous if the computing device 29 is configured to perform at least one of the above-mentioned steps of the method.

In accordance with said FIG. 6, and as already mentioned above, the measurement device 30 for compliance testing a device under test 32 comprises the computing device 29. In addition to this, the measurement device 30 comprises a wireless and/or wired interface 31 being connectable to the device under test 32.

In this context, it is noted that said wireless and/or wired interface 31 is exemplarily configured to be connectable to the communication interfaces of the device under test 32 as explained above.

It is further noted that it might be particularly advantageous if the measurement device 30 further comprises at least one further wireless and/or wired interface being connectable to at least one further device under test such as the further device under test 33.

In this context, it should be mentioned that at least one further wireless and/or wired interface can especially be configured to be connectable to the respective communication interfaces, exemplarily the respective at least two communication interfaces of the at least one further device under test such as the further device under test 33.

It is further noted that the above-mentioned wireless and/or wired interface 31 can comprise said at least one further wireless and/or wired interface. In other words, it might be particularly advantageous if the wireless and/or wired interface 31 is configured to be connectable to the device under test 32 and to at least one further device under test, such as the further device under test 33, or the respective communication interfaces thereof, respectively.

In this exemplary case according to FIG. 6, the wireless and/or wired interface 31 is advantageously connectable to the device under test 32 and to the further device under test 33 or the respective communication interfaces, exemplarily the corresponding at least four communication interfaces, respectively.

In this context, it is noted that it might be particularly advantageous if the computing device 29 is configured to switch to the further device under test 33 especially in an automated manner, and to perform at least one of the above-mentioned steps to said further device under test 33.

Especially as an alternative, the computing device 29 may be configured to perform at least one of the above-mentioned steps to the further device under test 33 in parallel to the device under test 32.

As it can further be seen from FIG. 6, the measurement device 30 exemplarily further comprises a display unit and/or a graphical user interface 34 being especially configured to display the above-mentioned statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report.

Advantageously, the statistical analysis especially with at the at least one graph or pie chart, respectively, can be displayed on said display unit and/or a graphical user interface 34 and can preferably be updated in real time.

For the sake of completeness, it is further noted that according to FIG. 6, the computing device 29 is exemplarily in connection with the wireless and/or wired interface 31.

Additionally, the computing device 29 is exemplarily in connection with the display unit and/or the graphical user interface 34.

Furthermore, especially in the case that the device under test 32 is connected to the wireless and/or wired interface 31 in a wireless and/or wired manner and/or at least one further device under test, such as the further device under test 33, is connected to the at least one further wireless and/or wired interface 31 or said wireless and/or wired interface 31, respectively, in a wireless and/or wired manner, it is noted that the exemplary embodiment of FIG. 6 can be seen as a measurement system comprising the measurement device 30 and the corresponding one or ones, respectively, of the device under test 32 and the at least one further device under test such as the further device under test 33.

While various embodiments of the present invention have been described above, it is to be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect one to only of several implementations, such feature may be combined with one or more other features of the other implementations as may be desired and advantageous for any given or particular application.

The invention claimed is:

1. A method for compliance testing a device under test, wherein the device under test is provided with more than one communication interface for a wireless and/or a wire-bound protocol, wherein the communication interfaces are configured for at least two different communication protocols, the method comprising the steps of:
- assigning a test protocol to each of the communication interfaces,
- automatically executing, at least once, each of the test protocols,
- setting up the test protocols with the aid of a user program and/or a script,
- setting up the respective speed during corresponding run time with respect to the test protocols with the aid of the user program and/or the script,
- creating a central report comprising the corresponding test results from at least a part, preferably each, of the test protocols, and
- performing a statistical analysis on the basis of the central report,
- wherein the user program and/or the script is configured as a plug-in, and
- wherein the statistical analysis is performed with the aid of artificial intelligence.

2. The method according to claim 1,
wherein the test protocols are executed at one test cycle, especially the same test cycle.

3. The method according to claim 1,
wherein the method further comprises the step of repeatedly executing at least a part, preferably each, of the test protocols.

4. The method according to claim 1,
wherein compliance testing comprises or is PHY compliance testing and/or Ethernet compliance testing.

5. The method according to claim 1,
wherein executing at least a part, preferably each, of the test protocols comprises applying at least one of different signal characteristics, preferably different test signal frequencies and/or different test signal levels, different disturbing signals, preferably different random disturbing signals and/or different pre-defined disturbing signals, different standards, preferably different communication standards and/or different IEEE standards.

6. The method according to claim 1,
wherein the method further comprises the steps of:
- switching to at least one further device under test especially in an automated manner, and
- performing at least one of the steps to said at least one further device under test.

7. The method according to claim 6,
wherein the method further comprises the step of creating a central report comprising the corresponding test results from at least one test with respect to the at least one further device under test, preferably at least a part or each of further test protocols.

8. The method according to claim 1,
wherein the method further comprises the step of performing a statistical analysis, preferably a statistical analysis comprising at least one graph especially visualizing at least a part of said statistical analysis, more preferably a statistical analysis comprising at least one pie chart especially visualizing at least a part of said statistical analysis, most preferably a statistical analysis comprising at least one graph and/or at least one pie chart for a synopsis of the corresponding test results of the central report, on the basis of the central report.

9. The method according to claim 8,
wherein the method further comprises the steps of:
- displaying the statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report, especially with the aid of a display unit and/or a graphical user interface, and/or
- updating the statistical analysis, preferably the statistical analysis comprising at least one graph especially visualizing at least a part of said statistical analysis, more preferably the statistical analysis comprising at least one pie chart especially visualizing at least a part of said statistical analysis, most preferably the statistical analysis comprising at least one graph and/or at least one pie chart for a synopsis of the corresponding test results of the central report, especially in real time.

10. A computing device being configured to perform at least one of the steps of the method according to claim 1.

11. A measurement device for compliance testing a device under test, the measurement device comprising:
- a computing device according to claim 10, and
- a wireless and/or wired interface being connectable to a device under test.

12. The measurement device according to claim 11, wherein the wireless and/or wired interface is connectable to at least one further device under test, and/or wherein the measurement device further comprises at least one further wireless and/or wired interface being connectable to at least one further device under test.

* * * * *